United States Patent [19]

Ukai et al.

[11] 4,360,209
[45] Nov. 23, 1982

[54] UNIVERSAL JOINT DUST BOOT ASSEMBLY

[75] Inventors: Mikio Ukai, Nagoya; Minoru Odagiri, Ichinomiya; Hidemi Sugiura, Takahama; Yasunori Hatanaka, Toyota, all of Japan

[73] Assignees: Toyoda Gosei Co., Ltd., Nagoya; Toyota Jidosha Kogyo Kabushiki Kaisha, Toyota, both of Japan

[21] Appl. No.: 179,565

[22] Filed: Aug. 19, 1980

[30] Foreign Application Priority Data

Mar. 11, 1980 [JP] Japan .................................. 55-31369

[51] Int. Cl.³ .............................................. F16D 3/84
[52] U.S. Cl. ............................. 464/175; 277/212 FB; 464/111
[58] Field of Search ................ 64/21, 325; 403/57–58; 277/212 FB

[56] References Cited

U.S. PATENT DOCUMENTS 3,817,057 6/1974 Orain ..................................... 64/32 F
4,132,422 1/1979 Sankey et al. ................. 277/212 FB

FOREIGN PATENT DOCUMENTS 1376005 12/1974 United Kingdom .

*Primary Examiner*—Robert I. Smith
*Attorney, Agent, or Firm*—Cushman, Darby & Cushman

[57] ABSTRACT

A dust boot for a universal joint covering two joint elements having largely curved corner portions in the outer peripheral surface thereof near their joint portion, comprises a resilient annular covering portion for covering the joint portion of the universal joint and two annular end portions which are integrally formed with the covering portion in axially both ends thereof. The annular end portions are mounted on the two joint elements near their joint portion. Since the area of an open end of the dust boot mounted on the joint element having largely curved corner portions is made smaller than the cross sectional area of the outer peripheral surface of the joint element, specifically only the curvature of the open end of the dust boot corresponding to the largely curved corner portions of the joint element is made smaller than that of the corner portions of the joint element, the dust boot can be closely mounted on the joint element with excellent sealing effect.

6 Claims, 3 Drawing Figures

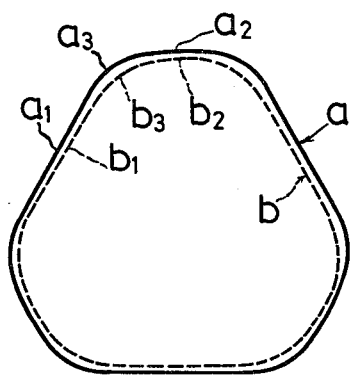
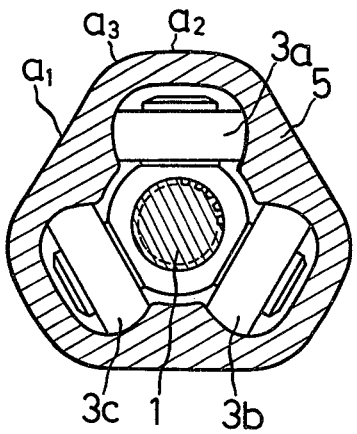
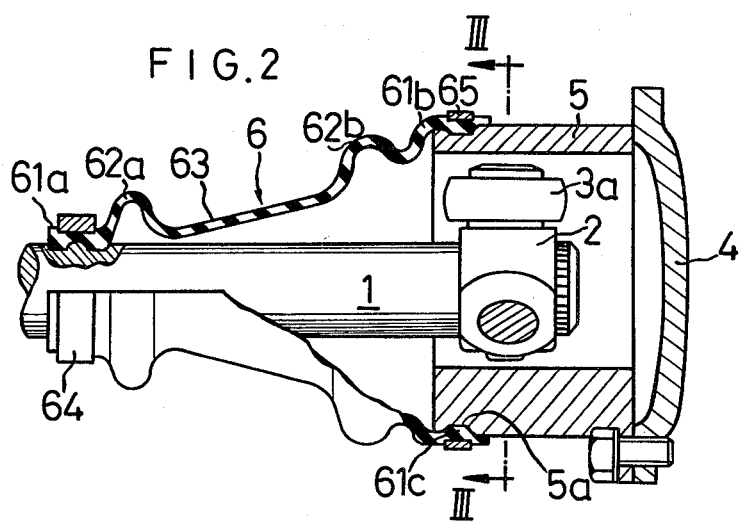

UNIVERSAL JOINT DUST BOOT ASSEMBLY

BACKGROUND OF THE PRESENT INVENTION

The present invention relates to a dust boot for a universal joint which is used in a drive system for an automobile.

In most cases, the universal joint is covered with a dust boot for protecting the universal joint from dust and water and for retaining lubricating oil. The dust boot is generally made of rubber or synthetic resin having resilience and flexibility. Each open end of the dust boot is closely fixed to each outer periphery of a first and a second joint elements of the universal joints. The dust boot covers the coupling portion of both joint elements by a covering portion thereof having a deformable shape such as bellows.

The first and second joint elements are generally a driving shaft and a driven shaft. An end of the second joint element is connected to a housing. Within the housing, an end of the other joint element is positioned and connected thereto so that the angular relation between joint elements can be freely changed.

One open end of the dust boot is closely mounted on the outer peripheral surface of the universal joint housing and the other end thereof is closely mounted on the outer peripheral surface of the shaft of the first joint element which is connected to the housing.

The outer peripheral surface of the housing can be formed into various shapes according to the coupling structure within the housing.

FIG. 1 shows one example of the shape of the outer peripheral surface of the housing. The outer peripheral surface of the housing which is shown by a rigid line a is composed of straight portions $a_1$, curved portions $a_2$ and corner portions $a_3$ which connect portions $a_1$ and $a_2$. The housing shapes an inflated triangle as a whole. And each of the corner portions $a_3$ has especially larger curvature than that of the other portions.

In general, a difference exists between the cross-sectional area; an open end of the dust boot made of resilient material and the outer peripheral surface of the housing on which the dust boot is mounted, for obtaining a strong clamping force.

The area of the end opening of the dust boot is formed smaller than the cross-sectional area of the outer peripheral surface of the housing.

However, when the open end of the dust boot is mounted on the housing having such a shape as described above, slippage often occurs therebetween so that the corner portions $a_3$ of the housing do not precisely face to the corner portions of the open end of the dust boot.

In such a case, in the corner portions $a_3$ of the housing, there occurs a gap between the housing and the open end of the dust boot so that the dust boot cannot sufficiently achieve a sealing effect.

The outer peripheral surface of the open end of the dust boot which is closely mounted on the housing is clamped by a ring, in general. However, in order to completely seal the universal joint and prevent the gap occurring in the corner portion $a_3$, a high clamping load is necessary. But such a high clamping load as is required for completely sealing the gap cannot be obtained by a hand work.

In order to improve the sealing effect, the open ends of the dust boot can be made deformable (for example, thin) and to make the interference larger. But, according to these methods, the ends of the dust boot are buckled so as to be easily damaged. And if the interference of the dust boot is made larger, it becomes difficult to closely mount the dust boot on the housing.

Accordingly, one object of the present invention is to provide a dust boot for covering a coupling portion of a universal joint composed of two joint elements, at least one of which has an outer peripheral surface having a changing curvature.

Another object of the present invention is to provide a dust boot which is easily mounted on the joint elements of the universal joint with excellent sealing effect.

DESCRIPTION OF THE DRAWINGS

Other objects and advantages of the invention will become apparent from the following description of embodiments with reference to the accompanying drawings wherein:

FIG. 1 is a view showing the outer peripheral surface of a housing and the shape of an open end of a dust boot to be closely fixed to the housing;

FIG. 2 is a partially cut-away longitudinal-sectional view of a homokinetic universal joint to which a dust boot of the present invention is applied; and FIG. 3 is a cross sectional view of the homokinetic universal joint taken along the line III—III of FIG. 2.

DETAILED DESCRIPTION OF THE PRESENT INVENTION

The dust boot of the present invention is characterized by the shape of the opening formed at the ends thereof so as to be closely fixed to the outer peripheral surface of the joint elements of which curvature is changed.

As shown in FIG. 1 by a dotted line, the end opening of the dust boot is composed of straight portions $b_1$, curved portions $b_2$ and corner portions $b_3$ connecting portions $b_1$ and $b_2$. The straight portions $b_1$ and the curved portions $b_2$ are similar figures to the straight portions $a_1$ and the curved portions $a_2$ of the outer peripheral surface of the joint element.

Each of the corner portion $b_3$ of the dust boot is formed so as to have a smaller curvature than that of the corresponding corner portion $a_3$ of the outer peripheral surface of the joint element.

The cross sectional area of the end opening b of the dust boot is formed smaller than that of the joint element. So, the interference between or the difference in size between the corners $b_3$ of the dust boot and the corner portions $a_3$ of the joint element changes so that the force between the dust boot and joint becomes larger or increases producing a tighter fit at those corner portions than at the other portions.

Therefore, even if slight slip occurs between the dust boot and the joint element, no gap is formed between the corner portions $a_3$ and $b_3$ since the corner portion $b_3$ is made smaller than the corner portion $a_3$.

Furthermore, since the difference in size or fit is made larger in the corner portions $a_3$ and $b_3$ only, the open end of the dust boot can be closely mounted on the joint element without difficulty.

And since the dust boot has such a shape as described above, a gap does not occur between the dust boot and the joint element even if they do not face to each other restrictly.

Hereinafter, one embodiment of the homokinetic universal joint of an automobile to which the dust boot of the present invention is applied, will be explained with reference to FIGS. 2 and 3.

A roller-supporting member 2 is mounted on splines machined on an end of a first shaft member 1 operating as one of joint elements.

Three roller axles are provided in the outer periphery of the roller-supporting member 2 so as to radially project and be spaced from one another at 120°. And rollers 3a, 3b and 3c are axially supported by the roller axles, respectively, and are accomodated within a housing 5 which is connected to the second shaft member (not shown) as the other joint element through a circular plate 4.

Within the housing 5, a guide surface for the rollers 3a, 3b and 3c is formed. The first shaft member 1 and the second shaft member which is engaged with the first shaft member 1 through the housing 5, are integrally rotated. The angular position of the first shaft member and the second shaft member can be changed within a predetermined range since the rollers 3a, 3b and 3c slide or rotate within the housing 5.

The outer peripheral surface of the housing 5 is formed like an inflated triangular cross sectional shape which is composed of three curved portions $a_2$ corresponding to each of the roller 3a, 3b and 3c, three straight portions $a_1$ and six corner portions $a_3$ connecting the portions $a_1$ and $a_2$.

Reference numeral 6 designates a bellow-shaped dust boot made of rubber. In the inclined peripheral surface between an end portion 61a having a smaller diameter and an end portion 61b having a larger diameter, convex portions 62a and 62b and a concave portion 63 are formed. The end portion 61a and the end portion 61b of the dust boot 6 are made thicker than the bellow portion thereof.

The opening of the end portion 61a is of a circular shape and is closely mounted to the outer periphery of the shaft member 1. And then the dust boot 6 is clamped by a ring member 64.

The dust boot 6 is characterized by the shape of the other open end portion 61b having a larger diameter. The diameter of the open end of the dust boot 6 is smaller than that of the outer peripheral surface of the housing 5 by the difference in size between the open end and the housing. The corresponding portions of the dust boot to the straight portions $a_1$ and $a_2$ of the outer peripheral surface of the housing 5 are similar to the portions $b_1$ and $b_2$ of the dust boot. And the portion $b_3$ of the dust boot corresponding to the corner portion $a_3$ of the housing 5 is formed so as to have a smaller curvature than that of the corner portion $a_3$. In the outer peripheral surface of the end of the housing 5, a groove 5a is formed in a circumferential direction thereof. And in the inner peripheral surface of the end portion 61b of the dust boot 6, a projecting portion 61c is provided in a circumferential direction.

The end portion 61b having a larger diameter than end 61a is forcibly enlarged due to the resilience of the dust boot and the projecting portion 61c of the dust boot 6 is closely engaged within a groove 5a of the housing 5. Then, the dust boot is clamped by a ring member 65.

When the dust boot 6 is mounted on the housing 5, grease for lubrication is introduced within the dust boot 6.

In the dust boot having the above described structure, the curvature thereof is equal to that of the outer peripheral surface of the housing except the portions $b_3$ corresponding to the corner portion $a_3$. Even if the cross sectional area of the end opening of the end portion 61b is made smaller, the dust boot 6 is not prevented from being closely mounted on the housing 5 thereby.

And by making the clamping force applied to the corner portions $a_3$ larger than that of the other portions, the gap formed in the corner portion $a_3$ can be prevented by a large clamping force, even if slight slip occurs between the housing 5 and the dust boot 6.

According to the dust boot of the present invention, more excellent sealing effect can be obtained compared with the conventional dust boot.

Furthermore, the dust boot 6 of the present invention is not always required to restrictly face to a corresponding portion of the housing 5 compared with the conventional dust boot. Therefore, the dust boot 6 is easily mounted on the housing 5.

The dust boot of the present invention can be also employed widely to cover other universal joint of which joint element is locally provided with corner portions of a larger curvature than that of the other portions.

Having now fully described the invention, it will be apparent to one of ordinary skill in the art that many changes and modifications can be made thereto without departing from the spirit or scope of the invention as set forth herein.

What is claimed is:

1. A universal joint sealing assembly comprised of two joint elements where at least one of said joint elements has a housing with an outer peripheral surface which includes a plurality of straight, curved and corner portions with the corner portiosn having a greater curvature than that of the other portions, an annular covering dust boot made of resilient material having two axially aligned annular open end portions integrally formed therewith;

said two open end portions being closely mounted on said two joint elements, respectively;

a sealing strip for clamping said annular covering portion onto said joint elements;

wherein the opening of at least one of said open end portions to be mounted on said at least one of said joint elements is provided with a like plurality of straight, curved, and corner portions wherein the curvature of the corner portions of said dust boot is smaller than that of said corner portions of said at least one of said joint elements; and the other portions of said at least end opening being shaped so as to be similar to the corresponding portions of said at least one of said joint elements so that there is greater tension at the corner portions between the housing and said dust boot.

2. A universal joint seal assembly for enclosing a universal housing, said assembly comprising an annular cover having two axially aligned ends each having means defining an opening at the end, at least one end having a plurality of straight, curved and corner portions for fitting over a like plurality of straight, curved and corner portions on said universal joint housing, wherein each corner portion included within said open means has a radius of curvature smaller than the complementary radius of curvature of the corner portion of said housing over which it will fit with the remaining portions of said opening means extending between the corner portions being shaped to substantially correspond to the complementary portions of said housing extending between the corner portions thereof and clamping means for clamping said at least one end onto said universal joint housing.

3. A universal joint seal assembly as in claim 1 or 2 wherein the annular cover between the ends thereof is formed in the shape of a bellow.

4. A dust boot for covering a universal joint for coupling together first and a second joint elements, said second joint element having corner portions on an outer peripheral surface thereof comprising:
   an annular flexible covering portion;
   a first and second annular open end portions integrally formed with said covering portion and closely mounted on said first and second joint elements, respectively,
   the area of said second open end portion having smaller corner open portions than the corner portions of said second joint element, shaped into a similar figure to said outer peripheral surface of said second joint element, and further having an inwardly projecting annular member closely engaging an annular groove on the outer peripheral surface of said second joint element.

5. A dust boot for covering a universal joint which has at least one corner portion and a straight portion on the outer peripheral surface of said joint, comprising:
   a flexible cover including an annular open end portion integrally formed with said cover and closely mounted on said outer peripheral surface;
   corner means on said cover for gripping said at least one corner portion, said corner means having a smaller radius of curvature that that of said at least one corner portion.

6. A dust boot for enclosing a universal joint housing, said dust boot having means defining an opening at one end and having at least one curved portion for fitting over at least one complementary curved portion on said housing, wherein each radius of curvature included within said opening means has a radius of curvature smaller than the complementary radius of curvature over which it will fit on the outer peripheral surface of said housing.

* * * * *